July 10, 1956

H. H. WOLFE ET AL 2,753,933

WATER SOFTENER

Filed April 30, 1952

INVENTORS
H. HIX WOLFE
RAYMOND ERISMAN JR.
BY Toulmin & Toulmin
ATTORNEYS

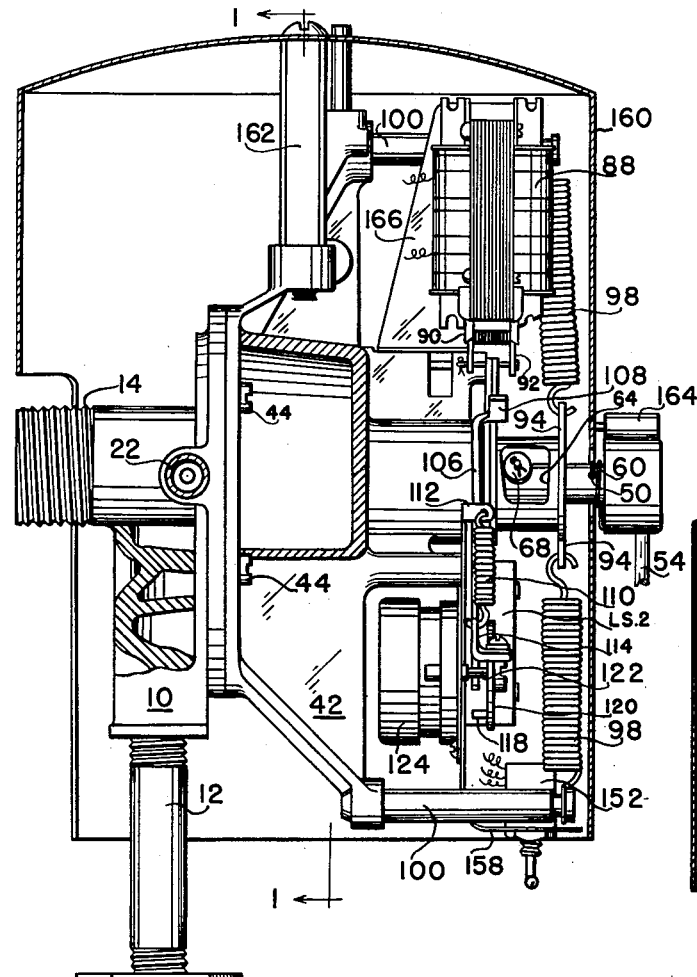
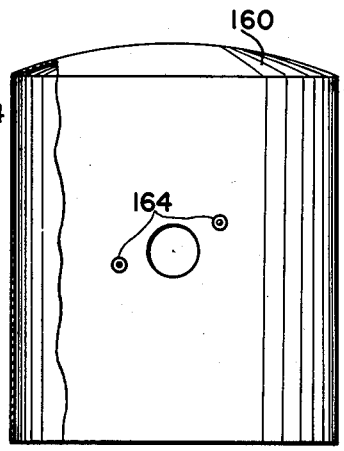
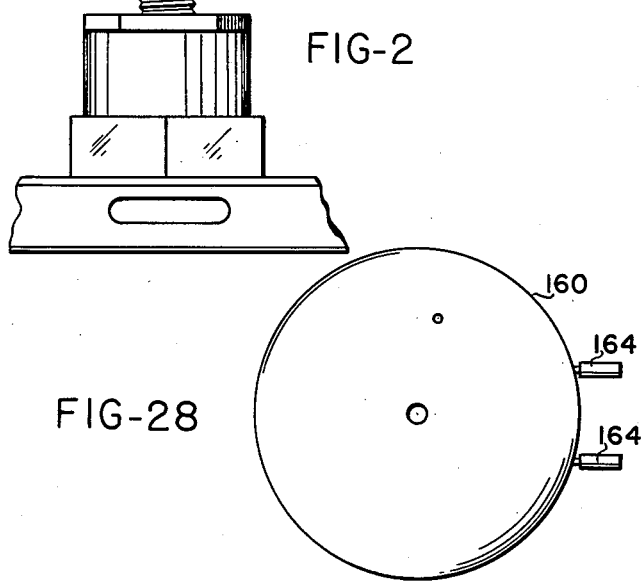
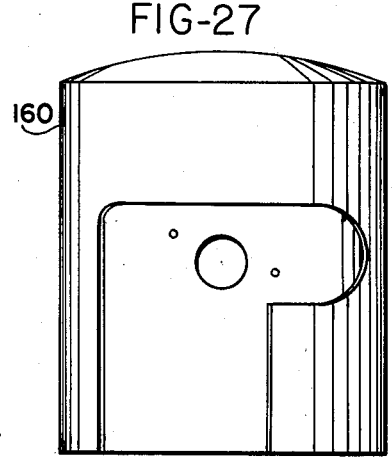
INVENTORS
H. HIX WOLFE
RAYMOND ERISMAN JR.
BY Toulmin & Toulmin
ATTORNEYS

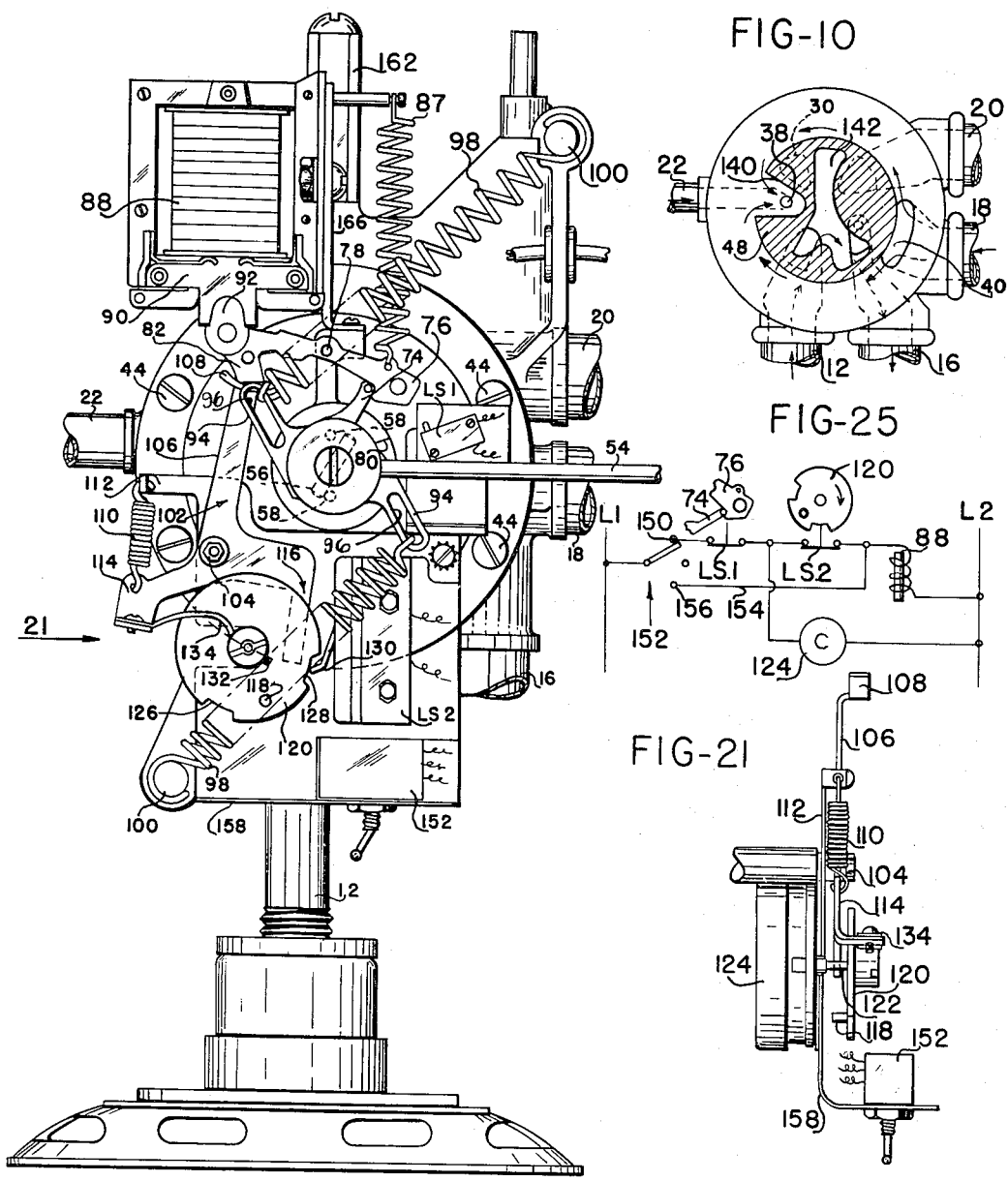

July 10, 1956  H. H. WOLFE ET AL  2,753,933
WATER SOFTENER
Filed April 30, 1952  6 Sheets-Sheet 4
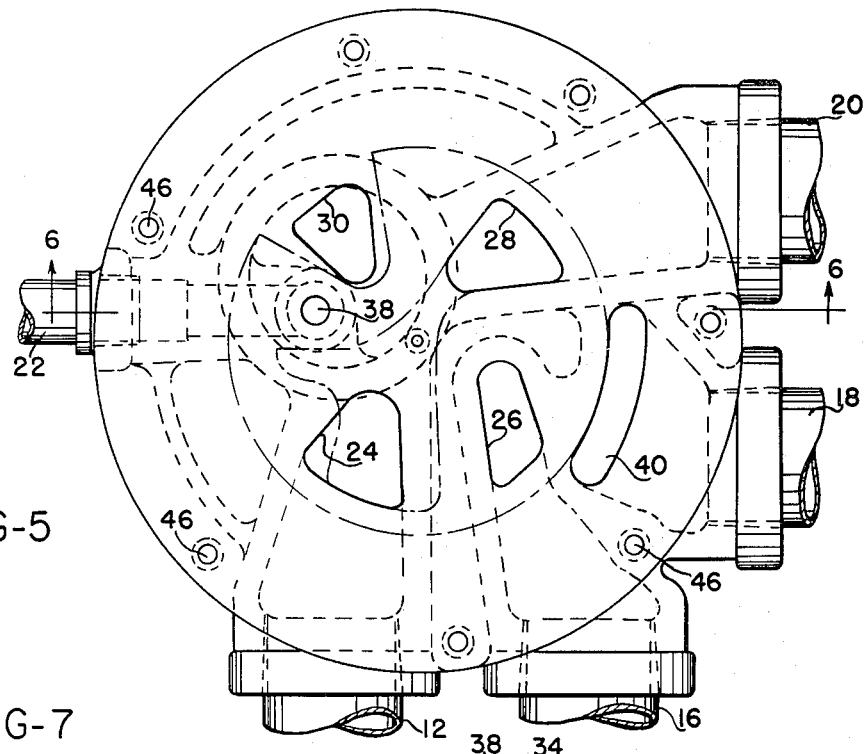
FIG-5
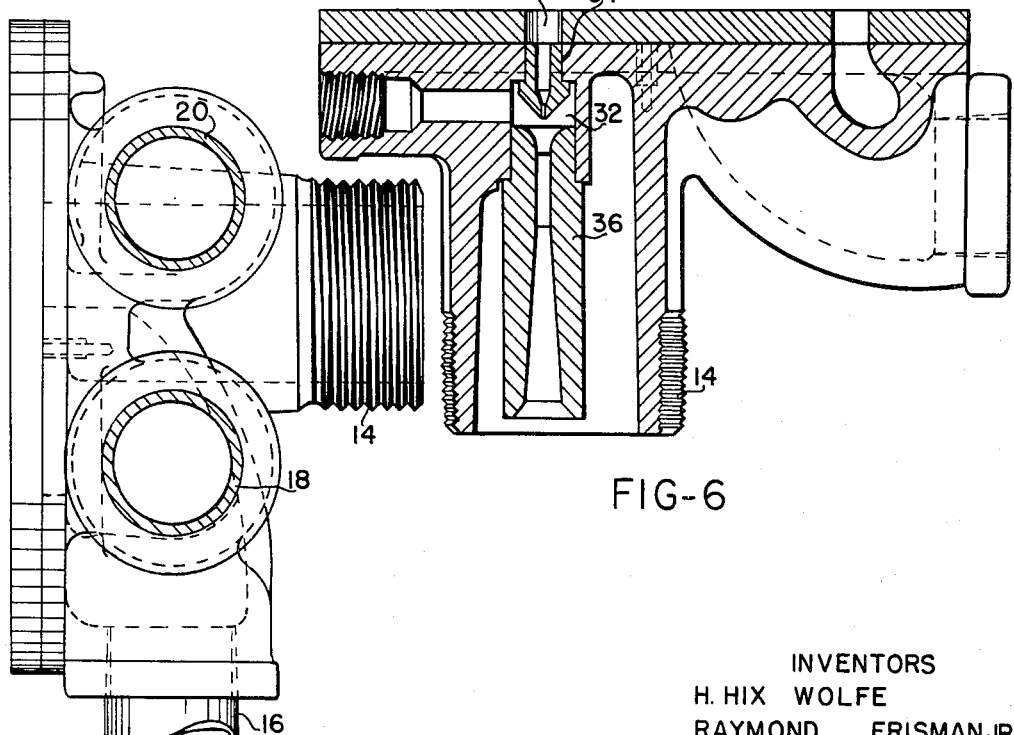
FIG-7
FIG-6
INVENTORS
H. HIX WOLFE
RAYMOND ERISMAN JR
BY Toulmin & Toulmin
ATTORNEYS

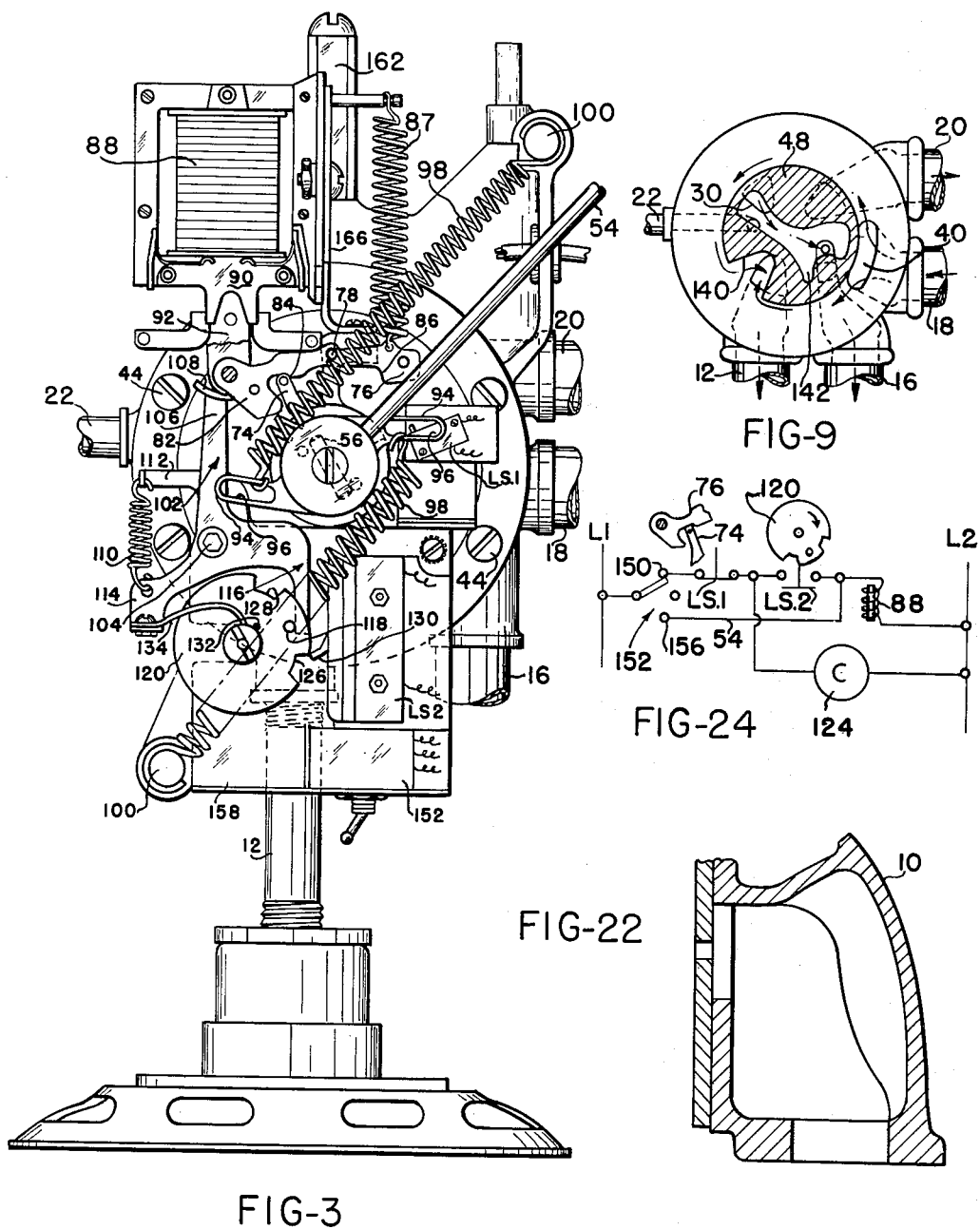

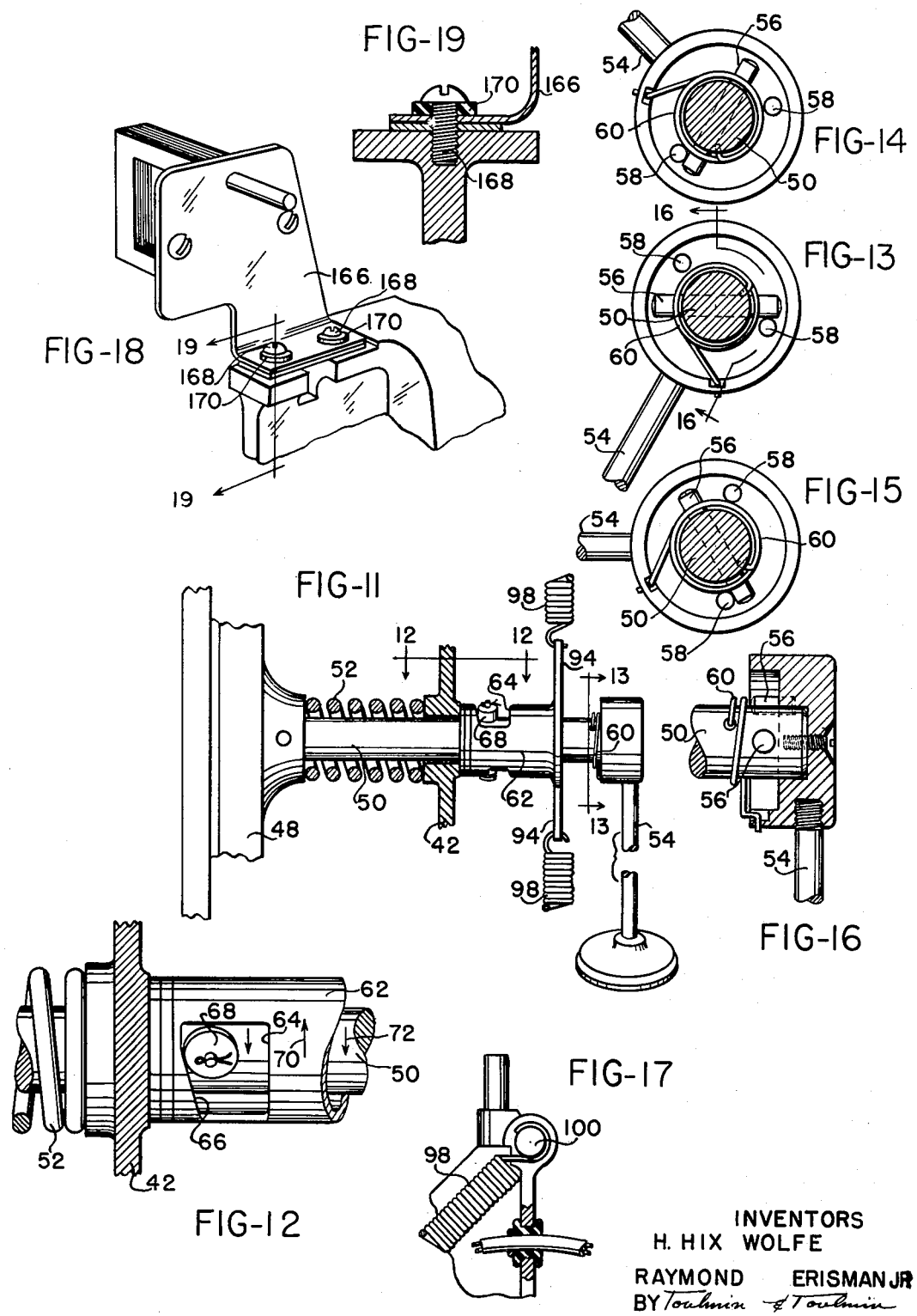

United States Patent Office 2,753,933
Patented July 10, 1956

2,753,933
WATER SOFTENER

H. Hix Wolfe and Raymond Erisman, Jr., Dayton, Ohio, assignors to The Duro Co., Dayton, Ohio, a corporation of Ohio Application April 30, 1952, Serial No. 285,156

16 Claims. (Cl. 161—7)

This invention relates to water softening systems and the like, and particularly to an improved control valve for controlling the flow of fluids in such a system, and to the manner in which the valve is operated.

Water softening systems of the zeolite type are well-known and consist of a main tank containing a body of mineral through which the water to be softened is passed. Periodically, the mineral in such a tank will require regeneration, and in accomplishing this the softening tank is usually backwashed to remove sediment and soil therefrom, then brine is supplied through the softening tank, which, through ionic exchange with the mineral, brings about the regeneration thereof, and then the softening tank is rinsed to remove all the brine therefrom. The softening tank is then again ready for service, and water to be softened can be passed therethrough.

The brining is accomplished by a supply of concentrated brine, and ordinarily the brine tank contains a surplus of salt, and at some time following the brining operation, a supply of fresh water is delivered to the brine tank to bring it up to its normal level.

The valve of the present invention is a main control valve adapted for connection in a softening system of the nature referred to having a softening tank and a brine tank and with all of the connections to the said tanks, to the hard water supply line, to the soft water service line, and to the drain or sewer line being controlled by the control valve.

Heretofore valves of this type have been constructed which have operated on an automatic cycle, but, due to the fact that a softener will remain in service for a long period of time, the proper control for an entire automatic softening system was never entirely satisfactory.

Furthermore, such full-automatic systems are extremely expensive, and to operate properly must include some arrangement for detecting either the hardness of the water leaving the softening system or must measure the volume that has passed through the system in order to initiate the automatic cycle at the proper time, and such detecting or measuring instrumentalities are expensive and difficult to incorporate in a softening system.

Having the foregoing in mind, the particular object of the present invention is the provision of a control valve for a water softening system of the zeolite type which is much simpler in construction and operation than valves according to the prior art.

A particular object is the provision of a control arrangement for the control valve such that a semi-automatic cycle will obtain, but which control arrangement is relatively simple and positive in operation.

A still further object is the provision of a main control valve for a zeolite water softening system having a semi-automatic control device associated therewith, which can be operated manually at any time without interfering with any subsequent semi-automatic cycle of operation.

A still further object is the incorporation in a valve of the nature referred to of constructional features tending to make the valve more inexpensive to construct, but which in no way detract from the efficiency of operation thereof.

These and other objects and advantages will become more apparent upon reference to the following description taken in connection with the accompanying drawings, in which:

Figure 2 is a view which may be indicated by line 2—2 on Figure 1, showing the valve from the side and partly in section;

Figure 3 is a view like Figure 1, but shows the valve adjusted to backwash position;

Figure 4 is a view like Figures 1 and 3, but shows the valve in its intermediate brining and rinse position;

Figure 5 is a view looking in at the face of the ported plate in the valve over which the valve rotor turns for making the various flow connections for controlling the operation of the system;

Figure 6 is a sectional view, indicated by line 6—6 on Figure 5;

Figure 7 is a view looking in from the right side of Figure 5;

Figure 9 is a view similar to Figure 8, but showing the position of the valve rotor when the valve is in its backwash position, as illustrated in Figure 3;

Figure 10 is a view like Figures 8 and 9, showing the position of the valve rotor when the valve is adjusted to its brine and rinse position, as illustrated in Figure 4;

Figure 11 is a view partly in section showing the connection between the manual operating lever for the valve and the valve rotor;

Figure 12 is a section, indicated by line 12—12 on Figure 11, showing a cam and roller arrangement by means of which the valve rotor is lifted off the ported plate of the valve at the moment of shifting thereof;

Figures 13 through 15 are views illustrating a lost motion connection between the operating lever and the rotor shaft of the valve;

Figure 16 is a sectional view, indicated by line 16—16 on Figure 13;

Figure 17 is a fragmentary sectional view showing the manner in which the electric supply line is carried through a partition of the valve structure.

Figure 18 is a perspective view showing the manner of mounting a solenoid frame on the valve;

Figure 19 is a sectional view, indicated by line 19—19 on Figure 18;

Figure 21 is a side view looking in the direction of the arrow 21 on Figure 4, showing a clockworks forming a part of the control arrangement for the valve and the cam driven thereby;

Figure 22 is a fragmentary sectional view through a portion of the valve;

Figure 24 is a view similar to Figure 23, but showing the conditions obtaining when the valve is in its Figure 3 position;

Figure 25 is a view like Figures 23 and 24, but showing the circuit conditions for the Figure 4 position of the valve; and Figures 26 through 28 are views illustrating the construction of a sheet metal housing which is mounted about the valve and control arrangement therefor.

Figures 1, 8, 20, 23:
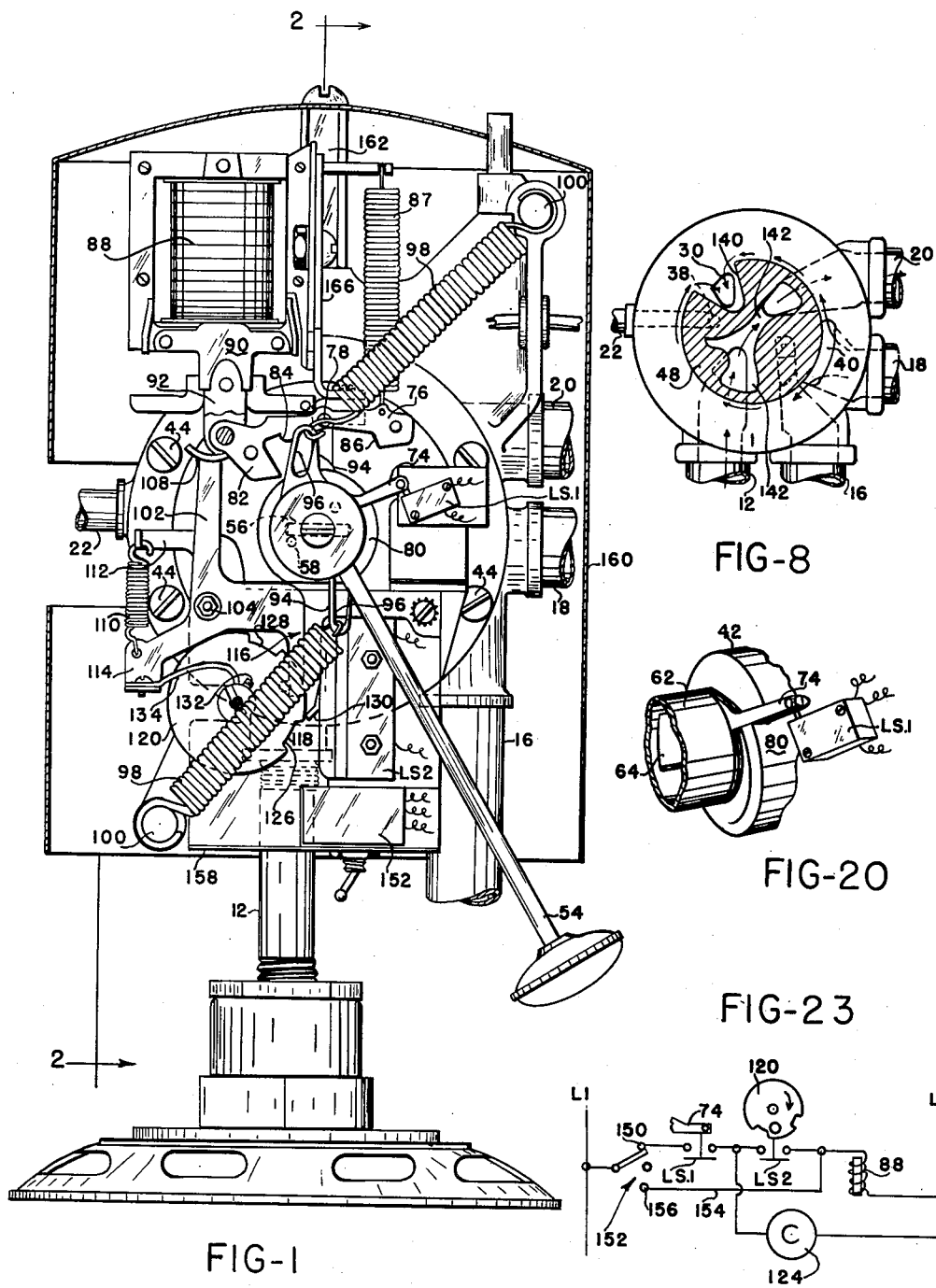
Figure 1 is a view looking in at the front of a control valve according to this invention with the cover which houses the valve and its controls in section, as indicated by section line 1—1 on Figure 2.
Figure 8 is a more or less diagrammatic view showing the position which obtains for the valve rotor relative to the ported plate of the valve when the valve is in its softening position, as illustrated in Figure 1.
Figure 20 is a perspective view showing a switch operating arm forming a part of the valve construction, and an abutment for stopping the said arm in one position.
Figure 23 is a diagrammatic wiring diagram, showing the circuit conditions which obtain when the valve is in its Figure 1 position.

Referring to the drawing somewhat more in detail, and particularly to Figures 1 through 7, the valve according to this invention comprises a valve body 10 having threaded ports for connection with the several pipes forming a part of the softening system. In the bottom of the valve body is a threaded port that receives pipe 12 that extends downwardly to the softening tank, either to the top or the bottom thereof, depending on whether the softening tank operates with upward flow or downward flow.

The back of the valve body includes a threaded extension 14 adapted for receiving a pipe leading to the end of the softener tank opposite the end of pipe 12. Also in the bottom of the valve body adjacent pipe 12 is a threaded port adapted for connection with pipe 16 that leads to the sewer or drain.

In the side of the valve body are two threaded ports, one of which is adapted for connection with pipe 18 through which the hard water to be softened is supplied to the system, and the other of which is connected with a pipe 20 through which the softened water goes to service. On the side of the valve body opposite pipes 18 and 20 is a threaded port for receiving pipe 22 leading to a brine tank.

The valve body consists of a plurality of internal passages, best seen in Figures 5 through 7, with the passage therein communicating with pipe 12 terminating at an internal port 24; the one communicating with pipe 16 terminating in an internal port 26; the one communicating with pipe 20 terminating in an internal port 28; and the threaded extension 14 terminating in an internal port 30.

As will be seen in Figures 5 and 6, the passage that communicates with brine pipe 22 opens into the valve body into a space 32 located between a jet 34 and a venturi 36, which venturi discharges into the passage through threaded extension 14. Jet 34 opens through the same face of the valve body as the ports 24, 26, 28, and 30 through the relatively small port 38.

The passage in the valve body leading to inlet pipe 18 opens through the face of the valve by means of a relatively elongated arcuate slot 40. It will be observed in Figure 5 that the slot 40 is disposed radially outwardly from the ports 24, 26, 28, 30 and 38, and the purpose of this is for permitting all of the said ports to be controlled by the valve rotor with the exception of the port or slot 40.

Turning now to Figure 2, the valve body which has just been described has mounted on the ported face thereof a hollow member 42 secured in place by the cap screws 44 that are threaded into the threaded holes indicated at 46 in Figure 5. Mounted within the hollow member 42 is a valve rotor which has the configuration that is illustrated in Figures 8, 9, and 10. This valve rotor has connected thereto a shaft extending out through hollow member 42 for connection with a manual operating lever and with a detent mechanism forming a part of this invention.

In Figure 11 the rotor described is indicated at 48, and the shaft connected thereto at 50. Between the wall of member 42 through which shaft 50 extends and the back of rotor 48 is a compression spring 52 which urges the said rotor into engagement with the ported face of valve body 10. As will be seen in Figures 8, 9, and 10, the valve rotor 48 is generally circular and is of such a size that its outer periphery is positioned inwardly of arcuate slot or port 40. The interior of hollow member 42 is thus always supplied with hard water from inlet pipe 18.

The extreme outer end of shaft 50 has rotatably mounted thereon an operating lever 54. Lever 54 has a lost motion connection with shaft 50 by virtue of a pin 56 extending through the shaft and spaced pins 58 carried by the lever and adapted for engagement with pin 56.

A torsion spring 60 is provided between shaft 50 and lever 54 for biasing the lever in one direction relative to the shaft for a purpose which will become more apparent hereinafter.

Rotatably mounted on shaft 50 between lever 54 and the outer wall of lever 52 is a sleeve 62 having apertures 64 therein on opposite sides, one side each of which apertures is beveled, as at 66, and engaged by roller means 68 carried on shaft 50. Sleeve 62 abuts the outer wall of hollow member 42 and is thus held against axial movement, and, therefore, when shaft 50 is rotated in the direction of the arrow 72 in Figure 12, it, together with the valve rotor, will be urged rightwardly, thus lifting the valve rotor off the ported face of the valve body to permit easy rotation of the valve rotor.

Similarly, when sleeve 62 is rotated in the direction of the arrow 70 in Figure 12, the same lifting of the valve rotor from the face of the valve body will occur, thus permitting the rotor to be turned quite easily.

Turning now to Figure 1, 3, and 4, it will be seen that there is projecting outwardly from sleeve 62 an arm 74, and this arm is adapted for cooperation with a latch member 76 that is pivoted at 78 to a box provided for the hollow member 42. Arm 74 is also adapted for engaging and opening a limit switch LS1 carried on a supporting bracket attached to hollow member 42 of the valve when the valve is in its Figure 1 position. In order to prevent arm 74 from striking limit switch LS1 with a greater force or from bearing thereagainst under a high pressure, the hollow member 42 is provided with an abutment 80 against which the said arm rests when the valve is in its Figure 1 position, as illustrated in Figure 20.

The latch member 76 consists of a dependent end part 82 so positioned as to engage and stop arm 74 when the valve is turned to its Figure 3 position. Spaced from the dependent portion 82 is an abutment 84 adapted for engagement with the opposite side of arm 74 so that when the said arm is shifted to its Figure 3 position, it will be retained therein by engagement with abutment 84. A spring 87 is effective at that time for holding latch member 76 in position to engage the end of arm 74.

At the opposite end of latch member 76 is still another abutment area 86 adapted for engagement arm 74 in the same manner as it is engaged by abutment 84. As will be seen hereinafter, a solenoid 88 having an armature 90 connected by link means 92 with the end of latch member 76 opposite its connection with spring 87 is energizable for tilting the latch member from its Figure 3 position to its Figure 4 position, and which shifting of the said latch member will bring about releasing of arm 74 from engagement with abutment 84 and permit it to move into engagement with abutment 86.

Sleeve 62 is likewise provided on the end thereof opposite the end from which arm 74 projects with a pair of slotted fingers 94 which are inclined from a radial position. Each of the fingers 94 has a slot 96 slidably engaging one end of a spring 98. Each of the springs extends from the finger to which it is connected to a stationary anchor post 100 that is carried by the hollow frame member 42. As will be seen on reference to Figures 1, 3, and 4, the springs 98 extend in such a direction relative to the slots 96 in the fingers 94 that when the valve is in its Figure 1 position, the ends of the springs in the slots 96 are at the outer ends of the said slots, whereas when the valve is shifted to its Figure 3 position, the ends of the springs slide inwardly to the end of the inner ends of the slots. Thereafter, when the valve is released from its Figure 3 position and moves to its Figure 4 position, the ends of the springs again slide outwardly to the outer ends of the slots 96. The purpose of this arrangement is so that the springs will not be unduly stressed when the valve is in its Figure 3 position, whereas, when the valve moves to its Figure 4 position, the lever arm for each spring is automatically increased, and a strong torque is exerted on sleeve 62 for rotating the valve rotor.

Pivotally mounted on hollow member 42 beneath the solenoid 88 is a three-armed lever 102 adapted for pivoting about screw 104. The upper end of arm 106 of the lever, and which arm extends vertically upwardly, has an arcuate head 108 thereon positioned directly under the connection between the armature 90 of the solenoid and the adjacent end of latch member 76. Three-armed lever 102 is movable from the position it occupies in Figures 1 or 3 to the position it occupies in Figure 4 by spring 110, and, when the arm is positioned in its Figure 4 position, the arcuate upper end 108 of arm 106 lies beneath the dependent portion 82 of latch member 76 and holds the latch member in that position.

The spring 110 is connected between a stationary anchor provided by the frame part 112 and a second arm 114 of the three-armed lever 102.

The three-armed lever 102 likewise has a third arm 116 which is adapted for engagement by a pin 118 carried by rotatable cam 120. The purpose of pin 118 and arm 116 is to rotate the three-armed lever 102 from its Figure 4 position back to its Figure 1 position at a predetermined time during the cycle of operation of the valve, thereby to release latch member 76 to the influence of spring 87.

Cam 120, as will be seen in Figures 1, 3, 4, and 21, is mounted on shaft 122 adapted for being driven by electric clock motor 124 at some predetermined slow rate, say, one revolution per hour.

The cam is generally circular, but has formed in its periphery the notches 126 and 128 and which notches cooperate with the actuating lever 130 of a limit switch LS2. The limit switch is so arranged with its actuating arm that when the actuaitng arm is riding on the raised portion of the periphery of cam 120 the switch is opened, but when the actuating lever drops into either of notches 126 and 128, the said switch is closed.

For a purpose which will become more apparent during the description of the operation of the valve, the hub of cam 120 has a pin 132 projecting therefrom and attached to the end of arm 114 is a resilient leaf 134 adapted for engagement with the said pin upon rotation of three-armed lever 102 about its pivot when the cam occupies a predetermined position.

Returning now to the valve rotor 48, in Figures 8, 9, and 10 this part of the valve will be seen to comprise a generally circular disk-like element having a V-shaped notch 140 in its periphery and having a central passage 142. When the valve rotor is in its Figure 8 position corresponding to the service position of the valve, the notch 140 communicates arcuate slot or port 40 with port 30 in the valve body leading into threaded extension 14, and the passage 142 in the valve rotor interconnects ports 24 and 28 of the valve body. It will be seen that the water entering the inlet pipe 18 is thus directed through the softening tank and then out service pipe 20, as indicated by the arrows in Figure 8.

When the valve is adjusted to its Figure 3 position, which is the backwash position of the valve, the valve rotor is in its Figure 9 position, and at that time notch 140 connects port 40 with port 24 and passage 142 connects port 30 with port 26. It will be seen by the arrows in Figure 9 that the flow of water from the hard water inlet pipe 18 through the softening tank is in the opposite direction from the direction of flow in Figure 8, and that the water leaving the softening tank flows out the sewer or drainpipe 16. It will also be noted that when the valve is in its Figure 9 position, the complete area of port 26 is not uncovered, but only a restricted portion thereof, so that the water flows through the softening tank at a controlled rate.

When the valve is adjusted to its Figure 4 or brining and rinsing position, the valve rotor is in the position illustrated in Figure 10, and wherein notch 140 connects port 40 with the port 38 leading to jet 34, while passage 142 interconnects ports 24 and 26.

The clock motor 124 and solenoid 88 are connected in circuit with limit switches LS1 and LS2 in the manner shown in Figures 23, 24, and 25. In these figures the power lines are indicated at L1 and L2, and connected therebetween in series with limit switch LS1 and contact 150 of a switch 152 is clock motor 124. It will be apparent that whenever limit switch LS1 is closed, clock motor 124 will run.

Arranged in parallel with clock motor 124 is solenoid 88 and limit switch LS2. A branch line comprising line 154 has one end connected between switch LS2 and solenoid 88 and leads to a second contact 156 of switch 152. Switch 152 comprises a toggle operated switch carried by the valve structure on the same bracket 158 that supports the clock motor 124. This positions the operating lever of the toggle switch in a position where it can be reached at all times.

The toggle switch is adjustable into three operative positions, its normal position being where it is closed on contact 150, and its other two positions being where it is closed on contact 156 and where it closes on neither of contacts 150 or 156.

The entire valve mechanism and the operative controls therefor described above are housed within a cylindrical cover member 160 which rests on a post 162 mounted on and extending upwardly from hollow member 42, and the cover member is apertured suitably for the passage of the pipes to the valve and the operating shaft for the valve. Preferably bumpers 164 are carried by the cover member to limit the movement of lever 54 when the valve is to be operated.

Inasmuch as there is some tendency for the solenoid 88 to vibrate when energized, we find it advantageous to support the solenoid on a bracket 166, as illustrated in Figures 18 and 19, and which bracket is held in place by clamp screw 168 under the head of which there is placed a resilient washer 170. This arrangement serves to damp out the vibrations of the solenoid, so that very quiet operation of the mechanism is had.

Operation

In operation, let it be assumed that the valve is adjusted to its service position, and in which case the ports would occupy the position illustrated in Figures 1 and 8. In order to commence a regenerating cycle, the lever 54 is availed of for rotating the parts of the valve to the position they occupy in Figure 3, and at which time arm 74 engages abutment 84 of latch member 76, so that the valve rotor is retained in its shifted position against the tension of springs 98. Spring 87 serves to retain the latch member in latching position.

At this time limit switch LS1 is closed by virtue of arm 74 having been shifted away from the limit switch, and this brings about energization of clock motor 124 for commencing the timed cycle of operation of the valve. After the valve has been shifted and the lever 54 is released, the torsion spring 60 will bias the lever clockwise to take up the lost motion between it and the shaft 50.

After a predetermined period of time, clock motor 124 drives cam 120 into position to bring notch 128 in the periphery of the cam into alignment with actuating lever 130 of limit switch LS2, thus permitting limit switch LS2 to close. When this switch closes, the circuit conditions of Figure 25 obtain and solenoid 88 is energized.

Energization of solenoid 88 will rock latch member 76 about its pivotal support against the bias of spring 87 and release arm 74 from abutment 84, whereupon springs 98 will quickly snap the valve rotor to its Figure 10 position, and at that time arm 74 strikes against abutment 86 of the latch member 76 and again comes to a halt.

During the period of operation of motor 124 to move cam 120 to its last-described position, the pin 118 shifted out of engagement with arm 116 of three-armed lever 102, and when solenoid 88 became energized, spring 110 became operative for shifting the three-armed lever to its Figure 4 position, and in which position the arcuate upper end 108 of arm 106 engages underneath dependent portion 82 of latch member 76 positively retaining the said latch member in its shifted position.

The clock motor 124 still being energized, it continues to run and to drive cam 120 so that a short time after solenoid 88 became energized in the manner just described, the actuating lever 130 of switch LS2 again rides up on the high part of cam 120 and again de-energizes solenoid 88. At this time, de-energization of the solenoid is without effect, because latch member 76 is positively retained in its Figure 4 position by arm 106. De-energization of the solenoid, however, assures a minimum consumption of power, and also insures quiet operation.

As will be evident upon reference to Figure 10, when the valve is in its Figure 4 position, brine is supplied to the softener tank by virtue of being drawn therein by the suction between jet 34 and venturi 36. Associated with the brine tank is a valve control of the nature disclosed in the co-pending application, Serial Number 268,703, filed January 29, 1952, and assigned to the same assignee as the instant application, and by means of this valve in the brine tank, after a predetermined amount of brine has passed through the softening tank, the supply of brine is interrupted, and thereafter the Figure 10 setting of the main valve will bring about a rinsing cycle.

After a predetermined period of time has expired, the cam 120 has rotated to the position where pin 118 again approaches arm 116 of three-armed lever 102. At that time, in order to insure that the clock motor will not stall, notch 126 in cam 120 again aligns with actuating lever 130 of switch LS2, thus permitting the switch to close and again to energize solenoid 88. With the solenoid energized, three-armed lever 102 is free to swing under the influence of pin 118 back to its Figure 1 position, and in which position it will not support latch member 76.

Thereafter, as soon as cam 120 has moved far enough that actuating lever 130 of switch LS2 commences to ride out of slot 126 and opens the said limit switch, solenoid 88 will again be de-energized, thus releasing latch member 76 to the influence of spring 87, which will immediately move the latch member to its Figure 1 position, releasing arm 74, and permitting springs 98 to snap the valve rotor back to service position with the said rotor being stopped when arm 74 strikes abutment 80. Movement of arm 74 into its Figure 1 position brings it in engagement with switch LS1, thus opening the switch and interrupting the entire cycle until lever 54 is again manually shifted to its Figure 3 position.

Inasmuch as the valve will be returned to its service position as soon as switch LS2 is opened by the cam, there is some possibility of the cam shifting backward slightly and permitting the switch to close after the valve has returned to service position, and which would make it impossible to commence a new regenerating cycle when it was desired to regenerate the system. In order to prevent this occurrence, the spring leaf 134 is arranged to engage one side of set screw 132, so that at the moment switch LS2 is open and spring 87 snaps latch member 76 back to its Figure 1 position, the end of the latch member will strike the three-armed lever 102, and therethrough by means of spring leaf 134 and set screw 132 urge the cam 120 to its Figure 1 position. In this manner it is positively prevented that the switch LS2 will be closed at the time a new regenerating cycle is commenced.

From the foregoing description of the operation, it will be apparent that movements of the valve member backwardly toward service position are quite sudden, due to the tension springs 98. For this reason, the lost motion connection between lever 54 and valve shaft 50 is provided, so that the valve member can snap quickly from position to position, but the lever 54 will not have the same snap movement, but will follow more slowly.

In certain locations, it may be desirable to backwash the softening tank at intervals in between successive cycles of regeneration. According to the present invention, this is readily accomplished by utilizing toggle switch 152 in the following manner: The toggle switch is first snapped to its neutral position and the valve is then shifted to backwash position, and in which position the valve member will be held stationary by latch member 76. Inasmuch as switch 154 is open at this time, the clock motor will not run and the valve will remain in backwash position for as long a time as is desired, say, from five to ten minutes. Thereafter, when it is desired to return the system to service, the switch 152 is snapped closed on its contact 156, which will cause energization of solenoid 88, but which will not energize clock motor 124. Energization of solenoid 88 will bring about movement of the armature thereof to shift latch member 76 to its Figure 4 position, and which movement of the latch member will permit the valve member to move to its intermediate position.

Immediately thereafter, switch 152 is returned to its normal position, wherein it is closed on contact 150 thereof, and which movement of the switch will bring about de-energization of solenoid 88, thereby releasing latch member 76 to the influence of spring 87, which will move the said latch member back to its Figure 1 position and permit the valve member to snap back to its service position.

This invention provides means for permitting the softening tank to be backwashed manually for any desired length of time, but without in any way disturbing the setting of the various parts of the control arrangement that will be operative on the next cycle of regeneration.

It will be understood that this invention is susceptible to modification in order to adapt it to different usages and conditions, and, accordingly, it is desired to comprehend such modifications within this invention as may fall within the scope of the appended claims.

We claim:

1. In a control valve for a water softener; a valve body having passages, a valve member rotatable for controlling said passages, means biasing the valve member in one direction toward a first position, manual means for moving the valve member against said biasing means to a second position, a latch member pivoted on the valve body urged toward a position to engage and retain the valve member in said second position, control means for moving the latch member into position to release the valve member from said second position and to engage it instead in an intermediate position, and said control means also being operable for returning the latch member to its first position to release the valve member from said intermediate position.

2. In a control valve for a water softener; a valve body having passages, a valve member rotatable for controlling said passages, means biasing the valve member in one direction toward a first position, manual means for moving the valve member against said biasing means to a second position, a latch member pivoted on the valve body having first and second means to engage said valve member in its second position and in an intermediate position respectively, a spring urging said latch member toward position to make the said first means effective to retain the valve member in its second position, control means to move the latch member so as to release the valve member from its second position and to make the said second means effective which will halt the valve member in its intermediate position, and means to release the latch member to the influence of its spring thereby to release the valve member from its intermediate position.

3. In a control valve for a water softener; a valve body having flow passages, a valve member for controlling the passages, a spring urging the valve member toward one rotated position, said valve member having a second rotated position and a third rotated position intermediate said first and second positions, a latch member pivoted on the valve body having a first position where it will engage the valve member in the said second position thereof but not in the said third position thereof and a second position where it will engage the valve member in its said third position but not in the said second position thereof, a spring biasing said latch member toward its first position, manual means for moving said valve member into its said second position, a solenoid energizable for moving the latch member to its second position, a switch in circuit with said solenoid, a cam controlling the opening and closing of said switch having a rest position where the switch is open, and means responsive to movement of said valve member into its second position for bringing about one complete rotation of said cam during which the cam provides for an initial period when the switch remains open, a second period when the switch is closed, and then finally the cam again opens the switch in returning to its rest position.

4. In a control valve for a water softener; a valve body having flow passages, a valve member for controlling the passages, a spring urging the valve member toward one rotated position, said valve member having a second rotated position and a third rotated position intermediate said first and second positions, a latch member pivoted on the valve body having manual means for moving said valve means into said second position, a first position where it will engage the valve member in the said second position thereof but not in the said third position thereof and a second position where it will engage the valve member in its said third position but not in the said second position thereof, a spring biasing said latch member toward its first position, a solenoid energizable for moving the latch member to its second position, a switch in circuit with said solenoid, a cam controlling the opening and closing of said switch having a rest position where the switch is open, an electric motor to drive said cam, and means responsive to movement of said valve member into its second end position for energizing said motor for bringing about one complete rotation of said cam during which the cam provides for an initial period when the switch remains open, a second period when the switch is closed and then finally the cam again opens the switch in returning to its rest position.

5. In a control valve for a water softener; a valve body having flow passages, a valve member for controlling the passages, a spring urging the valve member toward one rotated position, said valve member having a second rotated position and a third rotated position intermediate said first and second positions, manual means for moving said valve member into said second position, a latch member pivoted on the valve body having a first position where it will engage the valve member in the said second position whereof but not in the said third position thereof and a second position where it will engage the valve member in its intermediate position but not in the said second position thereof, a spring biasing said latch member toward its first position, a solenoid energizable for moving the latch member to its second position, a switch in circuit with said solenoid, a cam controlling the opening and closing of said switch having a rest position where the switch is open, an electric motor to drive said cam, means responsive to movement of said valve member into its said second position for energizing said motor for bringing about one complete rotation of said cam during which the cam provides for an initial period when the switch remains open, a second period when the switch is closed and then finally the cam again opens the switch in returning to its rest position, and means responsive to movement of the valve member back to its said one end position for de-energizing said motor.

6. In a control valve for a water softener; a valve body having flow passages, a valve member for controlling the passages, a spring urging the valve member toward one rotated position, said valve member having a second rotated position and a third rotated position intermediate said first and second positions, manual means for moving said valve member into said second position, a latch member pivoted on the valve body having a first position where it will engage the valve member in the said second end position thereof but not in the said third position thereof and a second position where it will engage the valve member in its said third position but not in the said second position thereof, a spring biasing said latch member toward its first position a solenoid energizable for moving the latch member to its second position, a switch in circuit with said solenoid, a cam controlling the opening and closing of said switch having a rest position where the switch is open, an electric motor to drive said cam, means responsive to movement of said valve member into its said second position for energizing said motor for bringing about one complete rotation of said cam during which the cam provides for an initial period when the switch remains open, a second period when the switch is closed and then finally the cam again opens the switch in returning to its rest position, and a second switch in circuit with both the motor and the solenoid positioned to be opened by said valve member upon the return thereof to its said one position.

7. In a control valve for a water softener; a valve body having flow passages, a valve member for controlling the passages, a spring urging the valve member toward one rotated position, said valve member having a second rotated position and a third rotated position intermediate said first and second positions, manual means for moving said valve member into said second position, a latch member pivoted on the valve body having a first position where it will engage the valve member in the said second position thereof but not in the said third position thereof and a second position where it will engage the valve member in its said third position but not in the said second position thereof, a spring biasing said latch member toward its first position, a solenoid energizable for moving the latch member to its second position, a switch in circuit with said solenoid, a cam controlling the opening and closing of said switch having a rest position where the switch is open, an electric motor to drive said cam, means responsive to movement of said valve member into its said second position for energizing said motor for bringing about one complete rotation of said cam during which the cam provides for an initial period when the switch remains open, a second period when the switch is closed and then finally the cam again opens the switch in returning to its rest position, and a second switch in circuit with both the motor and the solenoid positioned to be opened by said valve member upon the return thereof to its said one end position, there being an abutment to halt the valve member in its said one position.

8. In a control valve for a water softener; a valve body having flow passages, a valve member for controlling the passages, a spring urging the valve member toward one rotated position, said valve member having a second rotated position and a third rotated position intermediate with said first and second positions, a latch member pivoted on the valve body having a first position where it will engage the valve member in the said second position thereof but not in the said third position thereof and a second position where it will engage the valve member in its said third position but not in the said second position thereof, a spring biasing said latch member toward its first position, a solenoid energizable for moving the latch member to its second position, a switch in circuit with said solenoid, a cam controlling the opening and closing of said switch having a rest position where the switch is open, an electric motor to drive said cam, means responsive to movement said valve member into its said second position for energizing said motor, said cam momentarily closing said switch a predetermined time after energization of said motor to energize said solenoid, a lever spring urged toward position to engage and retain said latch member in its said second position, means on the cam operable a predetermined time after the said momentary closing of the switch to again close the switch while simultaneously moving said lever away from the said position, and said cam again opening said switch while the lever is so moved to permit return of said latch member to its first position.

9. In a control valve for a water softener; a valve body having flow passages, a valve member for controlling the passages, a spring urging the valve member toward one rotated position, said valve member having a second rotated position and a third rotated position intermediate said first and second positions, manual means for moving said valve member into its said second position, a latch member pivoted on the valve body having a first position where it will engage the valve member in the said second position thereof but not in the said third position thereof and a second position where it will engage the valve member in its said third position but not in the said second position thereof, a spring biasing said latch member toward its first position, a solenoid energizable for moving the latch member to its second position, a switch in circuit with said solenoid, a cam controlling the opening and closing of said switch having a rest position where the switch is open, an electric motor to drive said cam, means responsive to movement of said valve member into its second position for energizing said motor, said cam momentarily closing said switch a predetermined time after said motor is energized to energize said solenoid, a lever spring urged toward position to engage and retain said latch member in its said second position, means on the cam operable a predetermined time after the said momentary closing of the switch to again close the switch while simultaneously moving said lever away from the said position, and said cam again opening said switch while the lever is so moved to permit return of said latch member to its first position, said lever being arranged to be engaged and moved by said latch member as the latter returns to its first position and means on the lever for moving said cam to its rest position when the lever is so moved by said latch member.

10. In a control valve for a water softener; a valve body having flow passages, a valve member for controlling the passages, a spring urging the valve member toward one rotated position; said valve member having a second rotated position and a third rotated position intermediate said first and second positions, manual means for moving said valve member into its said second position, a latch member pivoted on the valve body having a first position where it will engage the valve member in the said second position thereof but not in the said third position thereof and a second position where it will engage the valve member in its said third position but not in the said second position thereof, a spring biasing said latch member toward its first position, a solenoid energizable for moving the latch member to its second position, a switch in circuit with said solenoid, a cam controlling the opening and closing of said switch having a rest position where the switch is open, an electric motor to drive said cam, means responsive to movement of said valve member into its second position for energizing said motor, said cam momentarily closing said switch a predetermined time after energization of said motor to energize said solenoid, a lever spring urged toward position to engage and retain said latch member in its said second position, means on the cam operable a predetermined time after the said momentary closing of the switch to again close the switch while simultaneously moving said lever away from the said position, and said cam again opening said switch while the lever is so moved to permit return of said latch member to its first position, said lever being arranged to be engaged and moved by said latch member as the latter returns to its first position, and means on the lever for moving said cam to its rest position when the lever is so moved by said latch member, there being means responsive to the return of said valve member to its first end position for deenergizing said motor.

11. In a control valve for a water softener: a valve body having flow passages, a valve member for controlling the passages, a spring urging the valve member toward one rotated position, said valve member having a second rotated position and a third rotated position intermediate said first and second positions, manual means for moving said valve member into its said second position, a latch member pivoted on the valve body having a first position where it will engage the valve member in the said second position thereof but not in the said third position thereof and a second position where it will engage the valve member in its said third position but not in the said second position thereof, a spring biasing said latch member toward its first position, a solenoid energizable for moving the latch member to its second position, a switch in circuit with said solenoid, a cam controlling the opening and closing of said switch having a rest position where the switch is open, an electric motor to drive said cam, means responsive to movement of said valve member into its second position for energizing said motor for bringing about one complete rotation of said cam during which the cam provides for an initial period when the switch remains open, a second period when the switch is closed and then finally the cam again opens the switch in returning to its rest position, a second switch in circuit with both the motor and the solenoid positioned to be opened by said valve member upon the return thereof to its said one position, and a manual switch in circuit with the motor and solenoid having a position where both the motor and solenoid are deenergized and another position where only the solenoid is energized.

12. In a control valve for a water softener; a valve body having passages, a valve member rotatable for controlling said passages, means biasing the valve member in one direction toward a first position, manual means for moving the valve member against said biasing means to a second position, latch means to latch the valve member in said second position, control means for actuating said latch means to release the valve member from said second position and for causing the latch means to engage and halt the valve member in an intermediate position, and said control means also actuating said latch means to release said valve member from said intermediate position.

13. In a control valve for a water softener; a valve body, a rotatable valve member, spring means biasing the valve member toward a first rotated position, said valve member having a second rotated position and a third rotated position intermediate said first and second positions, a latch member on the valve body biased toward a first position where it will engage said valve member only in the said second position thereof and retain it therein, said latch member being movable to a second position where it will engage said valve member only in the said third position thereof and retain it therein, manual means to move the valve member into its said second position while said latch member is in its first position, electrical means energizable for moving the latch member to its second position, time controlled means for energizing said electrical means a predetermined time after said valve member is moved to its second position, and said time controlled means being operable after a predetermined further time to release said latch member for movement back to its first position.

14. In a control valve for a water softener; a valve body, a rotatable valve member, spring means biasing the valve member toward a first rotated position; said valve member having a second rotated position and a third rotated position intermediate said first and second positions, a latch member on the valve body biased toward a first position where it will engage said valve member only in the said second position thereof, said latch member being movable to a second position where it will engage said valve member only in said third position thereof, manual means to move the valve member into its said second position while said latch member is in its first position whereby the latch member will engage said valve member and retain it in its said second position, and control means for thereafter first moving the latch member to its second position whereby said valve member is rotated by said spring means to its said third position and is halted therein by said latch member and said control means then moving said latch member back to its first position whereby said valve member is rotated by said spring means to its said first position.

15. In a control valve for a water softener; a valve body, a rotatable valve member, spring means biasing the valve member toward a first rotated position, said valve member having a second rotated position and a third rotated position intermediate said first and second positions, a latch member on the valve body biased toward a first position where it will engage said valve member only in the said second position thereof and retain it therein, said latch member being movable to a second position where it will engage said valve member only in the said third position thereof and retain it therein, manual means to move the valve member into its said second position while said latch member is in its first position, and time-controlled means for thereafter first moving the latch member to its second position and then back to its first position.

16. In a control valve for a water softener; a valve member movable for controlling fluid flow and having a plurality of shifted positions including two limit positions, said valve member being spring-urged toward one of said limit positions and being manually movable against the bias of said spring to the other limit position, electrically-operated control means for retaining said valve member in its said other limit position for a predetermined time and then for releasing it for movement to an intermediate position located between said limit positions for a predetermined length of time and then for releasing the valve member to its said one limit position, and manually-operated switch means in circuit with said electrically-operated control means for actuating the control means independently of elapsed time.

References Cited in the file of this patent

UNITED STATES PATENTS

| | | |
|---|---|---|
| 710,842 | Church | Oct. 7, 1902 |
| 1,055,803 | Runnion | Mar. 11, 1913 |
| 1,272,384 | Conrader | July 16, 1918 |
| 1,319,502 | Wright | Oct. 21, 1919 |
| 1,771,743 | Butler | July 29, 1930 |
| 1,780,471 | Galloway | Nov. 4, 1930 |
| 1,842,382 | Arey | Jan. 26, 1932 |
| 1,963,872 | Sheaffer | June 19, 1934 |
| 2,035,166 | Kimball | Mar. 24, 1936 |
| 2,055,964 | Brubaker | Sept. 29, 1936 |
| 2,235,287 | Daniels | Mar. 18, 1941 |
| 2,238,814 | Kneas | Apr. 15, 1941 |
| 2,345,223 | Upp | Mar. 28, 1944 |
| 2,517,206 | Houghton | Aug. 1, 1950 |
| 2,547,098 | Smith | Apr. 3, 1951 |
| 2,582,333 | Horodeck | Jan. 15, 1952 |